April 28, 1970     K. SCHNEIDER     3,508,674
DIPPER MOUNTING AND METHOD OF ASSEMBLY THEREOF
Filed July 17, 1968
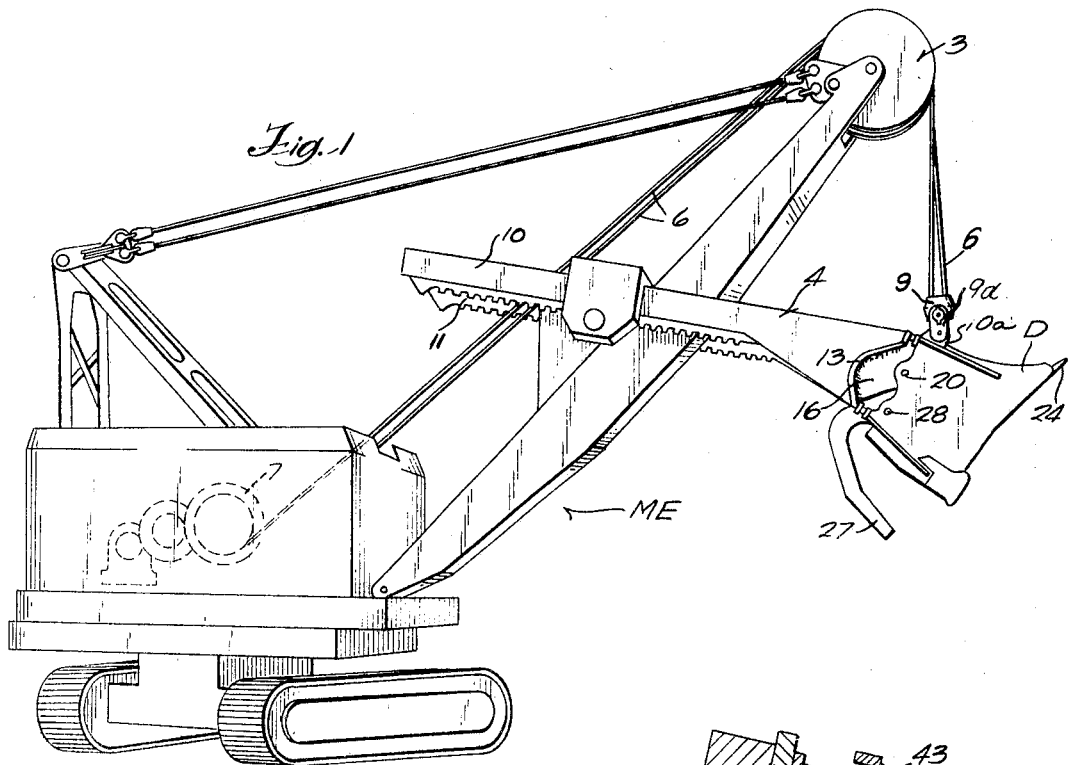
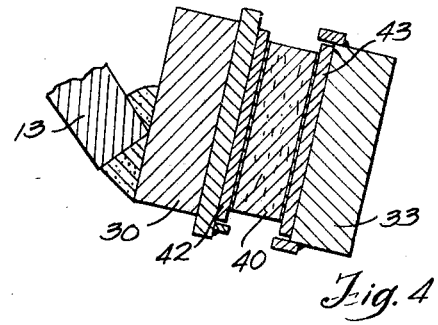
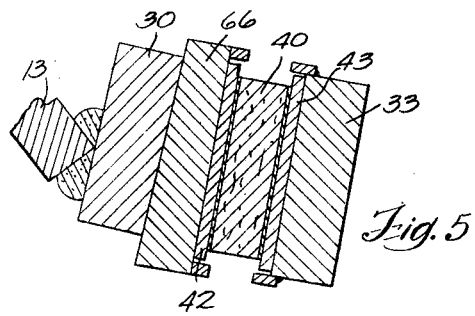
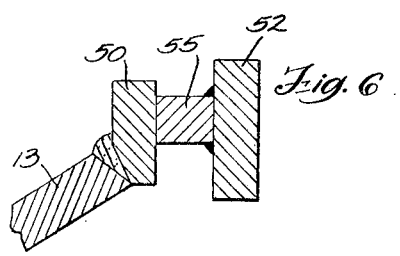
Inventor:
Karl Schneider
By: James E. Nilles
Attorney

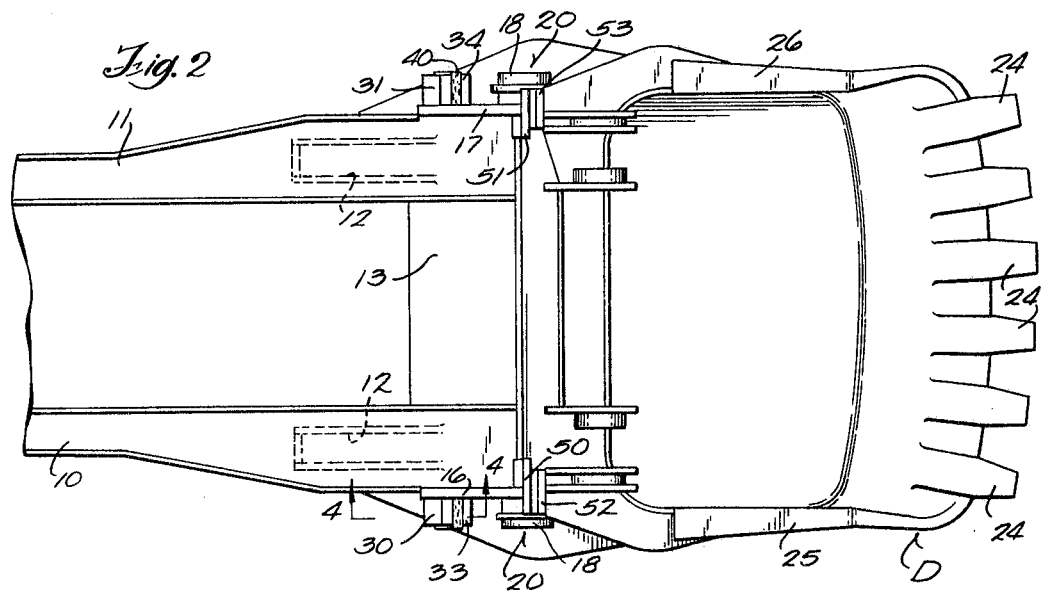
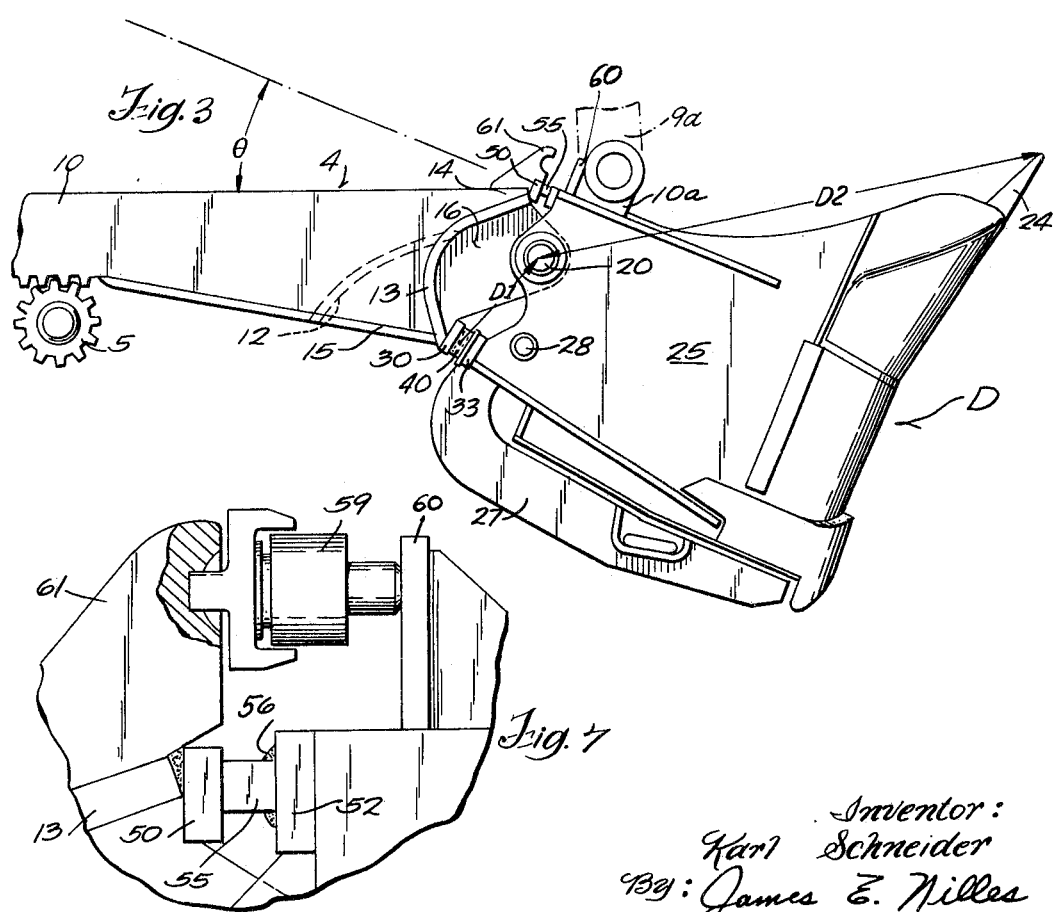

United States Patent Office 3,508,674
Patented Apr. 28, 1970

3,508,674
DIPPER MOUNTING AND METHOD OF ASSEMBLY THEREOF
Karl Schneider, Greenfield, Wis., assignor to Harnischfeger Corporation, Milwaukee, Wis., a corporation of Wisconsin
Filed July 17, 1968, Ser. No. 745,592
Int. Cl. B66f 9/00
U.S. Cl. 214—145                                                  13 Claims

ABSTRACT OF THE DISCLOSURE

A cushioned mounting for a dipper of a material handling machine such as an excavator or shovel. The dipper is mounted on a pin on the handle and the mounting also includes a resilient member on one side of the pin which can be preloaded by shims located on the other side of the pin. The method of assembling the dipper on the handle and preloading the cushion.

BACKGROUND OF THE INVENTION

The invention pertains to material handling machines having a vertically swingable bucket or dipper mounted on the end of a dipper stick. More particularly, the invention pertains to a cushion or resilient mounting for the dipper, which cushion can be preloaded.

Prior art dipper mountings have been proposed which utilize springs, such as shown in the U.S. Patent 1,766,255 of June 24, 1930 or 2,350,762 of June 6, 1944. U.S. Patent 2,180,348 of Nov. 21, 1936 suggested the use of a rubber wear plate to take up shock. These devices are unsatisfactory, however, with the advent of larger machines, particularly because the size required and because their capacities are unpredictable.

SUMMARY OF THE INVENTION

The present invention provides a mounting for a dipper on the dipper handle of a material handling machine, in which the dipper is mounted on the end of the handle and on a center pin, pads of resilient material such as polyurethane are located between the dipper and handle on one side of the said pin, and shim means are provided on the other side of the pin to precompress the pads and secure the dipper to the handle. The resulting preloaded mounting (1) eliminates flexing of the resilient pads under ordinary digging conditions or loads, so that flexing of the pads and consequent heat generation in the pads will take place only under excessive shock loads; (2) reduces heavy shock loads, reduces wear between moving parts; (3) permits rake angle adjustment of the dipper; (4) generally provides a sturdy mounting for the dipper which dampens high impact loading of the digging operation; and (5) reduces shock loads throughout the whole machine including the hoist machinery and hoist motor.

The invention also provides a method of assembling the dipper on the handle whereby (1) the pads can be preloaded with their opposite bearing surfaces arranged in parallelism to insure even flexing of the pads; (2) shim plates can be easily inserted and secured in the proper pad adjusted or preloaded position; and (3) the dipper rake angle can be easily varied. The pads are precompressed a predetermined percentage of their total deflection, to insure minimum generation of heat under the most severe shock conditions.

These and other objects and advantages of the present invention will appear hereinafter as this disclosure progresses.

BRIEF DESCRIPTION OF THE DRAWINGS

FIGURE 1 is a side elevational view of a machine, such as a mining shovel, embodying the present invention;

FIGURE 2 is a fragmentary top view of the dipper and handle end shown in FIGURE 1 but on an enlarged scale;

FIGURE 3 is a side elevational view of the dipper and a part of the handle of the machine shown in FIGURE 2;

FIGURE 4 is a fragmentary, sectional view taken along line 4—4 in FIGURE 2, of the resilient pad portion of the dipper mounting, but on an enlarged scale;

FIGURE 5 is a view similar to FIGURE 4, but showing shims being used together with the resilient pads;

FIGURE 6 is a fragmentary, sectional view of the preload shim portion of the dipper mounting shown in FIGURE 3, but on an enlarged scale;

FIGURE 7 is a view similiar to FIGURE 6, but showing a hydraulic jack in place for precompressing the resilient pads.

DESCRIPTION OF THE PREFERRED EMBODIMENT

The invention has been shown as applied to a mining excavator ME, which has a vertically swingable boom at the top of which sheave means 3 are mounted to guide the cable to the drum and hoist machinery on the main deck of the machine.

Handle

A handle 4 is movably mounted on the boom and swings about a rack pinion 5 and has a dipper D secured to the forward end thereof.

Hoist cables 6 extend from the drum 7 of the hoist machinery over sheaves 3 and then to the rope equalizer 9 which is secured through links 9a to ears 10a of the dipper.

The dipper handle 4 is comprised of a pair of generally parallel, spaced apart, box section type, steel sticks 10 and 11 which are fabricated from heavy alloy steel plates, and these sticks are rigidly secured together at their forward ends by means of an extra heavy curved or arched steel plate 13. Plate 13 extends laterally across, and between the ends of the sticks and is welded thereto to form a rigid, unitary handle having an upper side 14 and a lower side 15 (FIGURE 3). The handle has openings 12 at the lower side 15 and into which the dipper door hinges 27 can swing in opening.

The handle also includes a pair of spaced apart, parallel plates 16 and 17 which are welded to the arched plate 13 and extend forwardly therefrom. The forward ends of plates 16 and 17 have a dipper mounting means including hubs 18 and pins 20 which extend through plates 16 and 17 and through corresponding and aligned holes in the upper end of the dipper, thus forming the main fulcrum or axis for the dipper. The heavy curved or arched plate extends from the upper side 14, curves over the attaching center or fulcrum pin means 20, between the sticks, and then to said lower side 15. This forms a particularly simple, rigid and strong handle 4 of relatively light weight which efficiently transmits the heavy loads and thrust between the upper and lower sides of the handle.

The dipper D includes the digging teeth 24, sides 25 and 26, and back door 27 hinges pivoted at 28 at the rear end of the dipper.

Cushion means

Resilient cushion means are provided at the lower side of the dipper and handle as follows:

A pair of steel plate abutments 30 and 31 (FIGURE 2) are welded to the lower side 15 of the front end of the handle, one at each end of the arched plate 13. A pair of steel plate abutments 33 and 34 are welded along the lower, rear side of the dipper, one in closely spaced relationship to each of the abutments 30 and 31 on the handle. More specifically, abutments 30 and 33 lie in close relationship to one another. Abutments 31 and 34 are similarly located relative to one another.

A resilient pad 40 of material such as polyurethane, for example say three inches thick, is positioned between abutments 30 and 33 and also between abutments 31 and 34. These pads, in some instances, may be about 12 by 20 inches and are bonded to steel locating plates 42 and 43 (FIGURES 4 and 5) before being located between the abutments. In any event, these pads are of ample thickness to provide a certain amount of deflection beyond the set preload when subjected to heavy shocks. These pads are positioned between abutments 30 and 33 and also between abutments 31 and 34. These pads are of very generous load bearing area to allow low unit loading of the urethane material and are bonded to steel locating plates 42 and 43 (FIGURES 4 and 5) and thus held in position between the abutments.

These pads are preloaded in a manner as will appear later.

Shim means

Adjusting or preloading means are provided between the upper side 14 of the dipper and the handle, at opposite ends of the arched plate 13, as follows: A pair of steel plate abutments 50 and 51 are welded on the handle and a corresponding pair of abutments 52 and 53 are welded to the dipper. Abutments 50 and 52 are in close overlying relationship to one another, as are abutments 51 and 53. After the opposed abutments 50, 52 and 51, 53 have been urged apart in the precise amount to properly compress the resilient pads 40 located at the other side of the fulcrum pin 20, steel shims 55 are then insertable into the space between the adjacent opposed abutments and welded, as at 56 to one of the abutments.

Separating force means

The means for precompressing the urethane pads 40 before the shims are inserted, is as follows, and is shown in FIGURE 7. On machines of a size requiring them, a 100 ton jack 59 is inserted between the braces 60 and 61 fixed, respectively, to the dipper and handle and extending outwardly therefrom. These braces 60, 61 and the jack 59 therebetween are provided at both transverse sides of the assembly and, the two jacks are operated simultaneously to pivot the dipper D relative to the handle 4 and thereby compress the pads 40 about 10–15% of their original thickness.

The purpose of the present mounting is to dampen preferably only the excessive peak loads and the destructive accidental shock loads, therefore, the pads are permanently preloaded to about 75% of those loadings encountered in the average digging conditions under full bail pull.

Shim insertion

When the desired degree of preload has been obtained, the steel shims 55 of suitable thickness are inserted between the two pairs of abutments 50, 52 and 51, 53. The shims are then welded, as at 56 to only one abutment of each of the pair of abutments, to hold the shims 55 in place yet permit slight further separation between the adjacent abutments when a shock load causes additional compression of pads 40. After the shims are thus secured in place, the separating force, that is the jacks 59, are removed.

Shims of different thickness may be used between abutments 50, 52 and 51, 53 for changing the rake angle 0 (FIGURE 3) of the dipper, and a variation of about 8 degrees can be conveniently provided. When these variations are to be made, additional shims 66 (FIGURE 5) are used together with pads 40 between the pairs of abutments 30, 33 and 31, 34 of the handle 3 to thereby accommodate the various size shims used for changing the rake angle, and still maintain the proper compression of the resilient pads 40.

The shims 66 are more or less wedge shaped and of various thickness corresponding to the various dipper rake angles. When these shims are inserted between abutments 30 and 31 on one side, and pads 40 on the other side, they provide essential parallelism of plates 42, 43 so that pads 40 are evenly compressed at the point of preset. Furthermore, shifting of the wedge shaped shims 66 up or downward on each dipper side can provide additional adjustment for the pad placement to thereby even or balance the preload thickness of the pads on each dipper side.

General

As seen in FIGURE 3, the ratio of the distance D2 from fulcrum pin 20 to the tip of the dipper teeth on one side, and the distance D1 from the pin 20 to the center of the flexible pads on the other side is fairly large so that the amount of pad deflection allows a related larger deflection at the tip of the dipper teeth, and since the complete assembly of dipper and dipper handle swings at a variable distance, depending on the amount of crowd out, about the crowd pinion 5, the deflection at the dipper teeth will provide a related amount at the hoist rope links 10 and thus effect a cushion under severe shock loads, not only on the dipper and handle assembly, but also to the hoist rope, the boom, the related boom suspension system, and finally to the whole hoist machinery, including drum, gear train and hoist motor.

What is claimed is:

1. A material handling machine comprising, a swingable handle having a forward end, a dipper having a rear end, and mounted at its rear end on the forward end of said handle; a cushion mounting for attaching said dipper to said handle comprising, pivot means pivotally mounting the rear end of said dipper to said handle, resilient pad means between said dipper and handle at one side of said pivot means, and shim means wedged between said dipper and handle at the other side of said pivot means whereby said dipper is pivoted about said pivot means to compress said resilient pad means.

2. A material handling machine comprising, a swingable handle having a forward end, a dipper having a rear end and mounted at said rear end on said forward end of said handle; a cushioned mounting for attaching said dipper to said handle comprising, center pin means pivotally mounting said rear end of said dipper to said handle, abutments rigidly fixed to said forward end of said handle and to said rear end of said dipper and on each side of said pin means, resilient pad means between said abutments at one side of said pin means, and shim means wedged between said abutments at the other side of said pin means, whereby said dipper is pivoted about said pin means to compress said resilient pad means between its abutments.

3. A material handling machine comprising, a swingable handle having a forward end, a dipper having a rear end, and mounted at its upper end on the forward end of said handle; a cushioned mounting for attaching said dipper to said handle comprising, center pin means pivotally mounting the rear end of said dipper to said handle, an abutment rigidly fixed to said forward end of said handle and on each side of said pin means, an opposite abutment rigidly fixed to said rear end of said dipper and on each side of said pin means, the abutments on said handle and dipper which are located on one side of said pin means forming a first pair of abutments and being arranged in closely spaced and aligned proximity from one another, the abutments on said handle and dipper which are located on the other side of said pin means forming a second pair of abutments and also being arranged in closely spaced and aligned proximity to one another, resilient pad means between said first pair of abutments, and shim means wedged between said second pair of abutments whereby said dipper is pivoted about said pin means to compress said resilient pad means between said first pair of abutments.

4. A material handling machine comprising, a swingable handle, a dipper mounted at its rear end on said handle; said handle fabricated from a pair of generally parallel steel sticks arranged in laterally spaced relationship and having aligned forward ends for attachment to said dipper, center pin means at said forward ends for attaching a dipper, said handle also having an upper side and a lower side, and a curved steel plate extending laterally across and between said forward ends and from said upper side to said lower side and welded thereto to form a rigid unitary handle, said plate extending from said upper side and curving over said center pin means and between said sticks and then to said lower side; an abutment rigidly fixed to said forward end of said handle and on each side of said pin means, an opposite abutment rigidly fixed to said rear end of said dipper and on each side of said pin means, the abutments on said handle and dipper which are located on one side of said pin means forming a first pair of abutments and being arranged in closely spaced and aligned proximity from one another, the abutments on said handle and dipper which are located on the other side of said pin means forming a second pair of abutments and also being arranged in closely spaced and aligned proximity to one another, resilient pad means between said first pair of abutments, and shim means wedged between said second pair of abutments whereby said dipper is pivoted about said pin means to compress said resilient pad means between said first pair of abutments.

5. A material handling machine comprising, a swingable handle and a dipper mounted at its rear end on said handle; said handle fabricated from a pair of generally parallel steel sticks arranged in laterally spaced relationship and having aligned forward ends for attachment to said dipper, center pin means at said forward end for attaching said dipper, said handle also having an upper side and a lower side, and a curved steel plate extending laterally across and between said forward ends and from said upper side to said lower side and welded thereto to form a rigid unitary handle, said plate extending from said upper side and curving over said center pin means and between said sticks and then to said lower side; resilient pad means between said dipper and handle at one side of said pin means, and shim means wedged between said dipper and handle at the other side of said pin means whereby said dipper is pivoted about said pin means to compress said resilient pad means.

6. A material handling machine comprising, a swingable handle having a forward end, a dipper mounted at its rear end on the forward end of said handle; a cushioned mounting for attaching said dipper to said handle comprising, center pin means pivotally mounting the rear end of said dipper to said handle, a set of two abutments rigidly fixed to said forward end of said handle and one on each side of said pin means, a curved steel plate extending laterally across said handle and welded to said set of abutments, a second set of abutments rigidly fixed to said rear end of said dipper and one on each side of said pin means, the abutment on said handle and the abutment on said dipper which are located on one side of said pin means forming a first pair of abutments and being arranged in closely spaced and aligned proximity from one another, the abutment on said handle and the abutment on said dipper which are located on the other side of said pin means forming a second pair of abutments and also being arranged in closely spaced and aligned proximity to one another, resilient pad means between said first pair of abutments, and shim means wedged between said second pair of abutments whereby said dipper is pivoted about said pin means to compress said resilient pad means between said first pair of abutments.

7. The machine set forth in claim 6 further characterized in that said first pair of abutments have pad supporting surfaces which are in parallelism when said pad means is precompressed.

8. As an article of manufacture, a handle for a dipper of a material handling machine comprising, said handle fabricated from a pair of generally parallel steel sticks arranged in laterally spaced relationship and having aligned forward ends for attachment to a dipper, said handle also having an upper side and a lower side, and a curved steel plate extending laterally across and between said forward ends and from said upper side to said lower side and welded thereto to form a rigid unitary handle, and abutment plates on the upper and lower sides of said handle and located adjacent said plate.

9. As an article of manufacture, a handle for a dipper of a material handling machine comprising, said handle fabricated from a pair of generally parallel steel sticks and arranged in laterally spaced relationship and having aligned forward ends for attachment to a dipper, attaching means at said forward ends for attaching a dipper, said handle also having an upper side and a lower side, and a curved steel plate extending laterally across and between said forward ends and from said upper side to said lower side and welded thereto to form a rigid unitary handle, said plate extending from said upper side and curving over said attaching means and between said sticks and then to lower rear side, and abutment plates on the upper and lower sides of said handle and located adjacent said plate.

10. As an article of manufacture, a handle for a dipper of a material handling machine comprising, said handle fabricated from a pair of generally parallel steel sticks arranged in laterally spaced relationship and having aligned forward ends for attachment to a dipper, aligned apertures at said forward ends for receiving a pin to attach a dipper, said handle also having an upper side and a lower side, and a curved steel plate extending laterally across and between said forward ends and from said upper side to said lower side and welded thereto to form a rigid unitary handle, said plate extending from said upper side and curving around said aligned apertures and between and welded to said sticks and then to said lower side, and abutment plates on the upper and lower sides of said handle and located adjacent said plate.

11. A method of assembling a dipper on the end of a handle of a material handling machine to provide a cushion mounting therebetween, said method comprising, pivotally connecting said dipper to said handle about an axis, providing resilient pad means between said dipper and handle on one side of said axis, inserting shim means between said dipper and handle at said other side of said axis to thereby pivot said dipper about said axis and compress and hold said dipper in said pivoted position and said pad means compressed.

12. A method of assembling a dipper on the end of a handle of a material handling machine to provide a cushion mounting therebetween, said method comprising, pivotally connecting said dipper to said handle about an axis, providing resilient pad means between said dipper and handle on one side of said axis, applying a separating force between said dipper and handle at the other side of said axis to thereby pivot said dipper relative to said handle and about said axis to thereby cause said pad means to be compressed a predetermined amount, inserting shim means between said dipper and handle at said other side of said axis to thereby hold said dipper in said pivoted position and said pad means compressed, and then removing said separating force.

13. A method of assembling a dipper on the end of a handle of a material handling machine to provide a cushion mounting therebetween and for adjusting the rake angle of the dipper, said method comprising, pivotally connecting said dipper to said handle about an axis, providing resilient pad means between said dipper and handle on one side of said axis, applying a separating force between said dipper and handle at the other side of said axis to thereby pivot said dipper relative to said handle and about said axis to thereby cause said pad means to be compressed a predetermined amount, inserting shim means between said dipper and handle at each side of said axis to thereby adjust the rake angle and hold said dipper in said pivoted position, said pad means compressed and said dipper at the selected rake angle, and then removing said separating force.

References Cited

UNITED STATES PATENTS

| | | | |
|---|---|---|---|
| 1,917,666 | 7/1933 | Russell | 214—145 |
| 3,243,063 | 3/1966 | Learmont | 214—137 |

HUGO O. SCHULZ, Primary Examiner